United States Patent
Register, III

(10) Patent No.: US 8,335,417 B2
(45) Date of Patent: Dec. 18, 2012

(54) CRUSH-RESISTANT FIBER OPTIC CABLES EMPLOYING BEND-RESISTANT MULTIMODE FIBERS

(75) Inventor: James A. Register, III, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 237 days.

(21) Appl. No.: 12/888,898

(22) Filed: Sep. 23, 2010

(65) Prior Publication Data

US 2011/0075977 A1 Mar. 31, 2011

Related U.S. Application Data

(60) Provisional application No. 61/247,455, filed on Sep. 30, 2009.

(51) Int. Cl.
*G02B 6/44* (2006.01)
*G02B 6/04* (2006.01)

(52) U.S. Cl. .............. 385/100; 385/104; 264/1.28

(58) Field of Classification Search .......... 385/100, 385/102, 104, 105, 107, 108, 109, 111, 113; 264/1.28
See application file for complete search history.

(56) References Cited

U.S. PATENT DOCUMENTS

| | | | |
|---|---|---|---|
| 5,822,485 A | 10/1998 | Nelson et al. | 385/112 |
| 6,389,204 B1 | 5/2002 | Hurley | 385/102 |
| 6,487,347 B2 | 11/2002 | Bringuier | 385/113 |
| 6,775,444 B1 | 8/2004 | Hurley | 385/104 |
| 7,054,531 B2 | 5/2006 | Hurley et al. | 385/106 |
| 7,113,680 B2 | 9/2006 | Hurley et al. | 385/113 |
| 7,397,991 B1 | 7/2008 | Register | 385/102 |
| 7,460,753 B2 * | 12/2008 | Kewitsch | 385/113 |
| 7,986,863 B2 | 7/2011 | Fruhnert | 385/100 |
| 8,081,853 B2 * | 12/2011 | Overton | 385/102 |
| 8,218,925 B2 | 7/2012 | Bohler et al. | 385/107 |
| 2008/0008430 A1 * | 1/2008 | Kewitsch | 385/113 |
| 2010/0135623 A1 * | 6/2010 | Overton | 385/102 |
| 2011/0075977 A1 * | 3/2011 | Register, III | 385/100 |
| 2011/0075980 A1 * | 3/2011 | Register, III | 385/113 |
| 2011/0135259 A1 | 6/2011 | Guenter et al. | 385/103 |
| 2011/0268400 A1 * | 11/2011 | Lovie et al. | 385/113 |
| 2011/0305420 A1 * | 12/2011 | Bickham et al. | 385/78 |

* cited by examiner

*Primary Examiner* — Brian Healy
(74) *Attorney, Agent, or Firm* — Russell S. Magaziner

(57) ABSTRACT

A crush-resistant fiber optic cable is disclosed, wherein the cable includes a plurality of bend-resistant multimode optical fibers. The fibers are generally arranged longitudinally about a central axis, with no strength member arranged along the central axis. A tensile-strength layer surrounds the plurality of bend-resistant optical fibers. A protective cover surrounds the tensile-strength layer and has an outside diameter $D_O$ in the range $3 \text{ mm} \leq D_O \leq 5 \text{ mm}$.

20 Claims, 5 Drawing Sheets

US 8,335,417 B2

CRUSH-RESISTANT FIBER OPTIC CABLES EMPLOYING BEND-RESISTANT MULTIMODE FIBERS

PRIORITY APPLICATION

This application claims the benefit of U.S. App. No. 61/247,455, filed Sep. 30, 2009, the entire contents of which are hereby incorporated by reference.

BACKGROUND

1. Field of the Disclosure

The present disclosure relates generally to fiber optic cables, and in particular relates to crush-resistant fiber optic cables.

2. Technical Background

Conventional fiber optic cables include optical fibers that conduct light for transmitting voice, video and/or data. The construction of fiber optic cables should preserve optical performance when deployed in the intended environment while also meeting the other additional requirements for the environment. Mechanical requirements or characteristics, such as crush performance, permissible bend radii, temperature performance, and the like, are preferred to inhibit undesirable optical attenuation or impaired performance during installation and/or operation within the space. In addition to the mentioned requirements, riser and/or plenum spaces may require a ruggedized design for meeting the demands of the space.

In many applications, it is desirable for a fiber optic cable to include a plurality of optical fibers. With the increased demand for optical communications, there has been a corresponding demand to increase the number of optical fibers, i.e., the fiber count, of a fiber optic cable. By increasing the fiber count of a fiber optic cable, a single fiber optic cable is able to support additional optical communication channels.

Fiber optic cables employing a plurality of multimode optical fibers are often used in data centers, where the transmission length is relatively short compared to long-haul distances. Because data centers have limited space in which to deploy fiber, it is preferred that the multi-fiber fiber optic cables be as small as possible (i.e., have as small a diameter as possible). Small-diameter multi-fiber fiber optic cables have been fabricated using conventional optical fibers. However, to make the cable diameter small, the strength elements (e.g., a central strength element) are typically eliminated.

Additionally, fiber coatings that provide protection may be eliminated to increase fiber density. For example, 250-micron fibers may be used instead of 900-micron tight buffered fibers. This makes the conventional multi-fiber fiber optic cable more prone to damage due to crushing. When subjected to particular types of crushing forces, such as being pressed into by other equipment, stepped on, or objects with sharp features being placed atop or against the cable, the multiple optical fibers within the cable are pushed against one another and incur relatively sharp bends. This sharp bending leads to attenuation or even the complete loss of signal traveling in the optical fibers.

Therefore, there is a need in the art multi-fiber fiber optic cables having a relatively small diameter while also being resistant to crushing forces that cause strong bends in the optical fibers.

SUMMARY

An aspect of the present embodiments is a crush-resistant fiber optic cable that includes a plurality of bend-resistant multimode optical fibers. The fibers are generally arranged longitudinally about a central axis, with no strength member arranged along the central axis. A tensile-strength layer surrounds the plurality of bend-resistant optical fibers. A protective cover surrounds the tensile-strength layer and has an outside diameter $D_O$ in the range 3 mm$\leq D_O \leq$5 mm.

Another aspect of the present embodiments is a crush-resistant fiber optic cable having a central axis. The cable includes a plurality of bend-resistant multimode optical fibers each having a nominal diameter of 250 microns and generally arranged longitudinally about the central axis, with no strength member arranged along the central axis. The cable also includes a layer of aramid yarn immediately surrounding the plurality of bend-resistant optical fibers. The cable also includes a protective cover immediately surrounding the tensile-strength layer and having an outside diameter $D_o$ in the range 3 mm$\leq D_O \leq$5 mm.

Another aspect of the present embodiments is a method of forming a crush-resistant fiber optic cable having a central axis. The method includes disposing a plurality of bend-resistant multimode optical fibers generally longitudinally about the central axis, with no strength member arranged along the central axis. The method also includes surrounding the plurality of bend-resistant optical fibers with a tensile-strength layer. The method additionally includes surrounding the tensile-strength layer with a protective cover having an outside diameter $D_O$ in the range 3 mm$\leq D_O \leq$5 mm.

It is to be understood that both the foregoing general description and the following detailed description present embodiments of the disclosure, and are intended to provide an overview or framework for understanding the nature and character of the disclosure as it is claimed. The accompanying drawings are included to provide further understanding of the disclosure, and are incorporated into and constitute a part of this specification. The drawings illustrate the various example embodiments of the disclosure and, together with the description, serve to explain the principles and operations of the disclosure.

DETAILED DESCRIPTION

Figure 1:
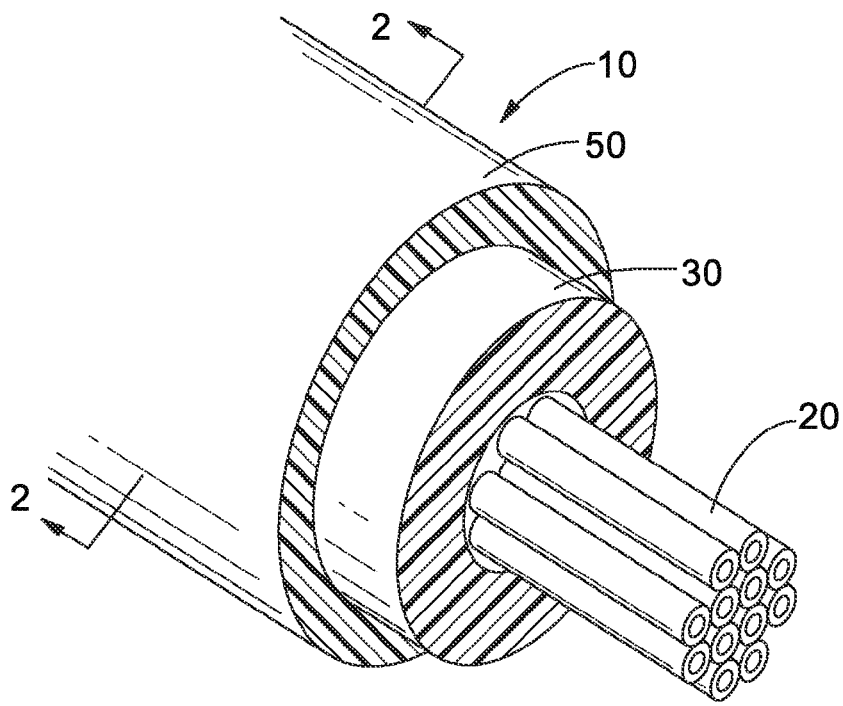
FIG. 1 is fragmentary perspective view.

Reference is now made in detail to the present preferred embodiments of the disclosure, examples of which are illustrated in the accompanying drawings. Whenever possible, identical or similar reference numerals are used throughout the drawings to refer to identical or similar parts. It should be understood that the embodiments disclosed herein are merely examples with each one incorporating certain benefits of the present disclosure. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure in view of, but not limited to the embodiments described herein.

Figure 2:
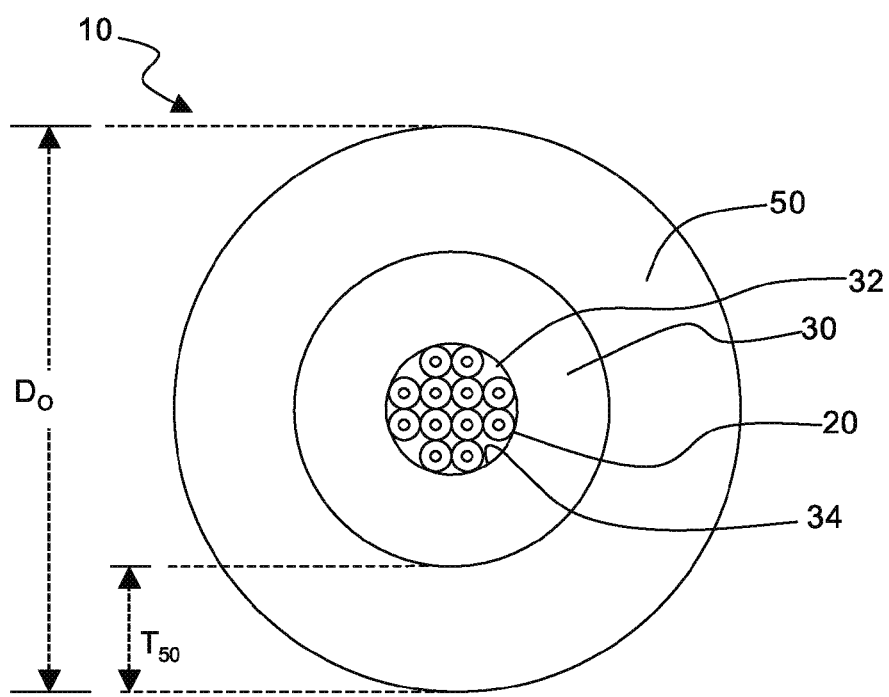
FIG. 2 is a cross-sectional view of an example crush-resistant fiber optic cable according to one example embodiment.

FIG. 1 is a fragmentary perspective view and FIG. 2 is a cross-sectional view of a crush-resistant fiber optic cable (hereinafter, "fiber optical cable") 10 according to one embodiment (the cross-hatching is omitted from FIG. 2 for ease of illustration). Fiber optic cable 10 of the present disclosure can have other configurations as described below, although the fiber optic cable of FIG. 1 and FIG. 2 will be described in more detail hereinbelow for purposes of illustration. Fiber optic cable 10 is suitable for use, for example, as a distribution cable in a data center of a telecommunications system or network. An example fiber optical cable 10 has an outside diameter $D_O$ in the range 3 mm$\leq D_O \leq$5 mm, with $D_O$=4.4 mm being an exemplary outside diameter suitable for many applications, and certain embodiments having a $D_O$ of less than 4.5 mm.

Fiber optic cable 10 has a central axis A1 and includes a plurality of bend-resistant multimode ("BR-MM") fibers 20 generally centered about and traveling in the direction of the central axis. Example BR-MM fibers 20 have a nominal diameter of 250 microns and have an acrylic coating. A typical number of BR-MM fibers 20 is six or twelve, though other numbers of BR-MM fibers may be used depending on the particular application and the size constraints on fiber optic cable 10. In an example, BR-MM fibers 20 are color-coded. BR-MM fibers 20 are described in greater detail below.

Fiber optic cable 10 also includes a tensile-strength layer 30 that surrounds BR-MM fibers 20. In an example embodiment, tensile-strength layer 30 immediately surrounds and contacts BR-MM fibers 20, as shown. In an example embodiment, tensile-strength layer 30 includes stranded aramid yarn. Tensile-strength layer 30 also serves as a cushioning layer that protects BR-MM fibers 20. Tensile-strength layer 30 defines an interior region 32 centered on fiber axis A1 in which BR-MM fibers reside. Interior region 32 has in interior surface 34 defined by tensile-strength layer 30.

Fiber optic cable 10 also includes a protective outer layer in the form of a cable jacket 50 that surrounds cushioning layer 30. In an example embodiment, cable jacket 50 immediately surrounds tensile-strength layer 30 and portions of the tensile strength layer contact the jacket. Cable jacket 50 can be formed of various materials, such as polymers, but is typically formed of a plastic, such as PVC. As an alternative to the PVC, cable jacket 50 may be formed of other plastics including flame retardant polyethylene (FRPE), a fluoro-plastic, such as PVDF, a fluoro-compound as disclosed by U.S. Pat. No. 4,963,609 or blends of PVC and PVDF or PVC and PE. Cable jacket 50 can also be designed to have increased burn resistance such that fiber optic cable 10 has a riser, a plenum and/or a low smoke zero halogen rating. In this regard, cable jacket 50 can include aluminum trihydrate, antimony trioxide or other additives that increase the burn resistance of the cable jacket as known to those skilled in the art and as described by U.S. Pat. No. 6,167,178, which patent is incorporated by reference herein. Additionally, cable jacket 50 can be designed to be resistant to UV light, if so desired. An example thickness $T_{50}$ for cable jacket 50 is in the range 0.75 mm$\leq T_{50} \leq$1.25 mm, with 1.05 mm being an exemplary thickness. The cable jacket 50 can be formed, for example, by extruding a polymer over the layer 30.

Figure 3:
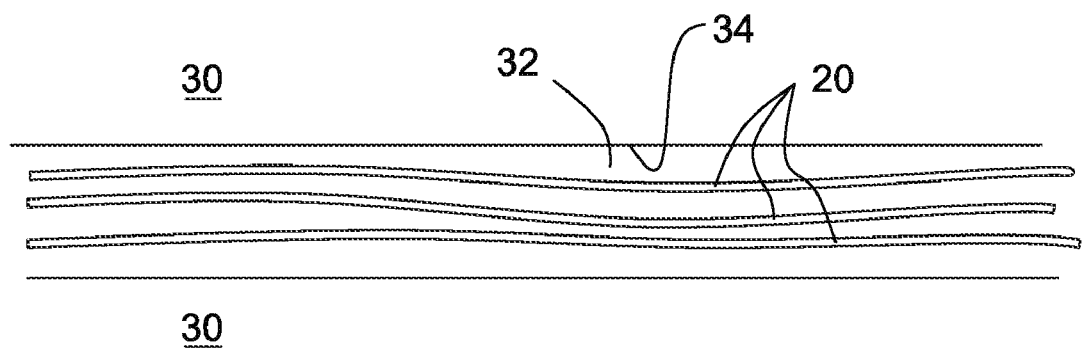
FIG. 3 is a side cut-away view of the crush-resistant fiber optic cable of FIG. 1 showing three bend-resistant optical fibers within the interior region defined by the tensile-strength layer and illustrating the generally axial orientation of the optical fibers in the absence of a crushing force.

Note that BR-MM fiber 20 has no central strength member. Conventional cables generally include a rigid glass-reinforced plastic (GRP) rod that extends the length of the cable, which increases the cable cross-section as well as cable rigidity. The absence of a central strength member allows for fiber optic cable 10 to have a relatively small diameter. However, as discussed above, and as illustrated in FIG. 3 and FIG. 4, it also allows for the BR-MM fibers 20 carried therein to be severely bent (see bends 29) when subjected to certain types of crushing forces CF that impact interior region 32 and the optical fibers therein. This is because there is no "backbone" in fiber optic cable 10 that can absorb crushing force CF and keep BR-MM fibers 20 in relative alignment with minimal bending.

The use of BR-MM fibers 20 does not reduce the amount of bending induced by crushing force CF, but rather makes fiber optic cable 10 less susceptible to reduced performance or even failure when crushing force CF severely bends BR-MM fibers 20. This is because BR-MM fibers 20 have a much smaller minimum bending radius than conventional multimode fibers. Example types of crushing forces CF that cause severe bends 29 arise, for example, from fiber optic cable 10 being stepped on or by being pressed into by an edge or other part of an object, such as telecommunications equipment. Generally, any localized force that causes fiber optic cable 10 to strongly bend or that is capable of putting a dent in the cable can cause severe bends 29. Note that it only takes one strong bend 29 in one of BR-MM fibers 20 to potentially adversely affect the performance of fiber optic cable 10.

Bend-Insensitive Multimode Fibers

Figure 5:
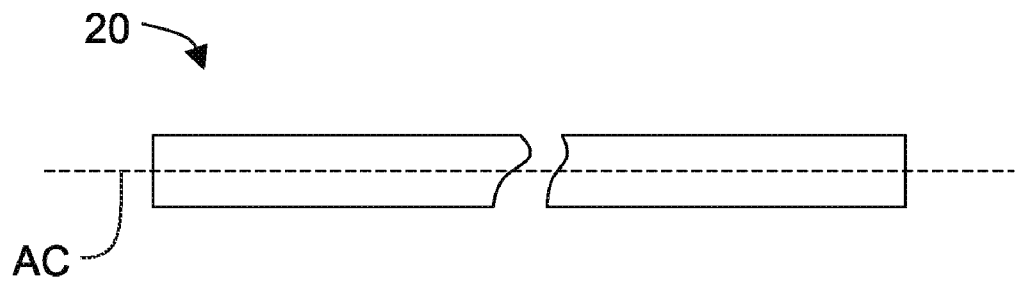
FIG. 5 is a side view of an example bend-resistant multimode optical fiber used in example embodiments of crush-resistant fiber optic cable disclosed herein.
Figure 6:
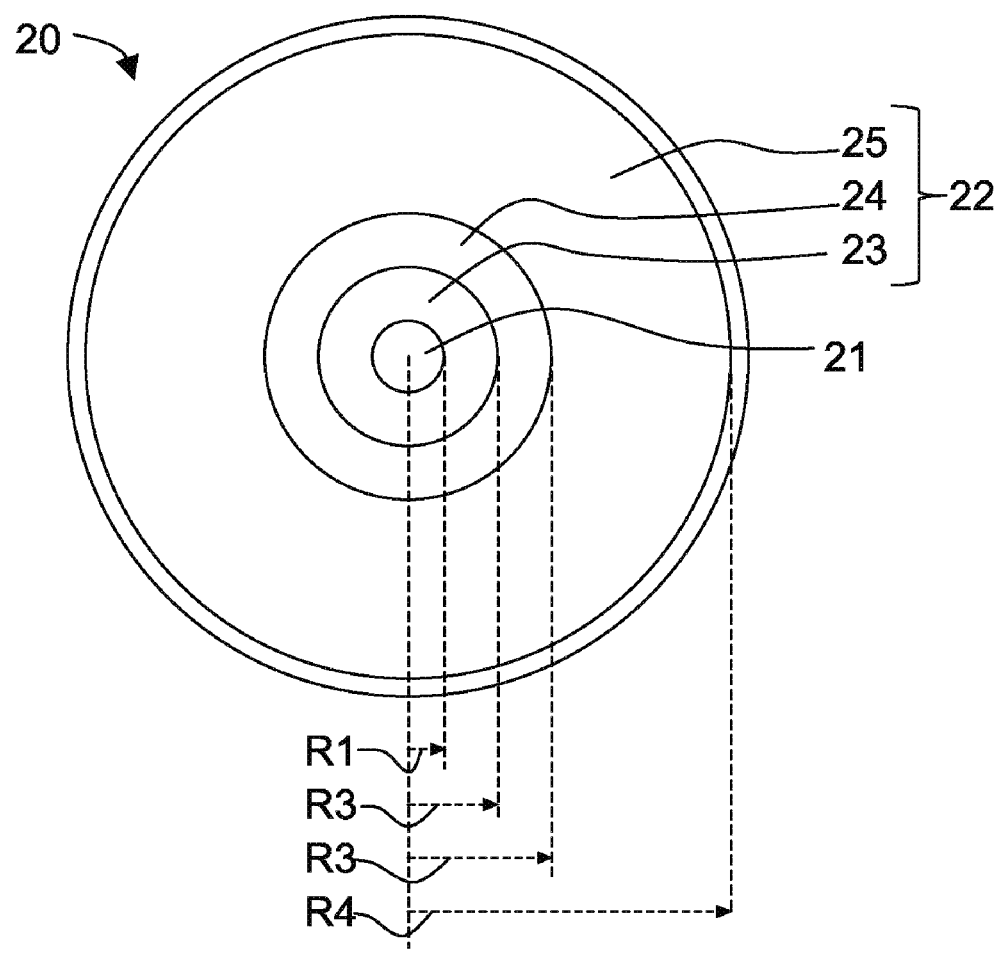
FIG. 6 is a schematic representation (not to scale) of a cross-sectional view of the bend-resistant multimode fiber of FIG. 5.
Figure 7:
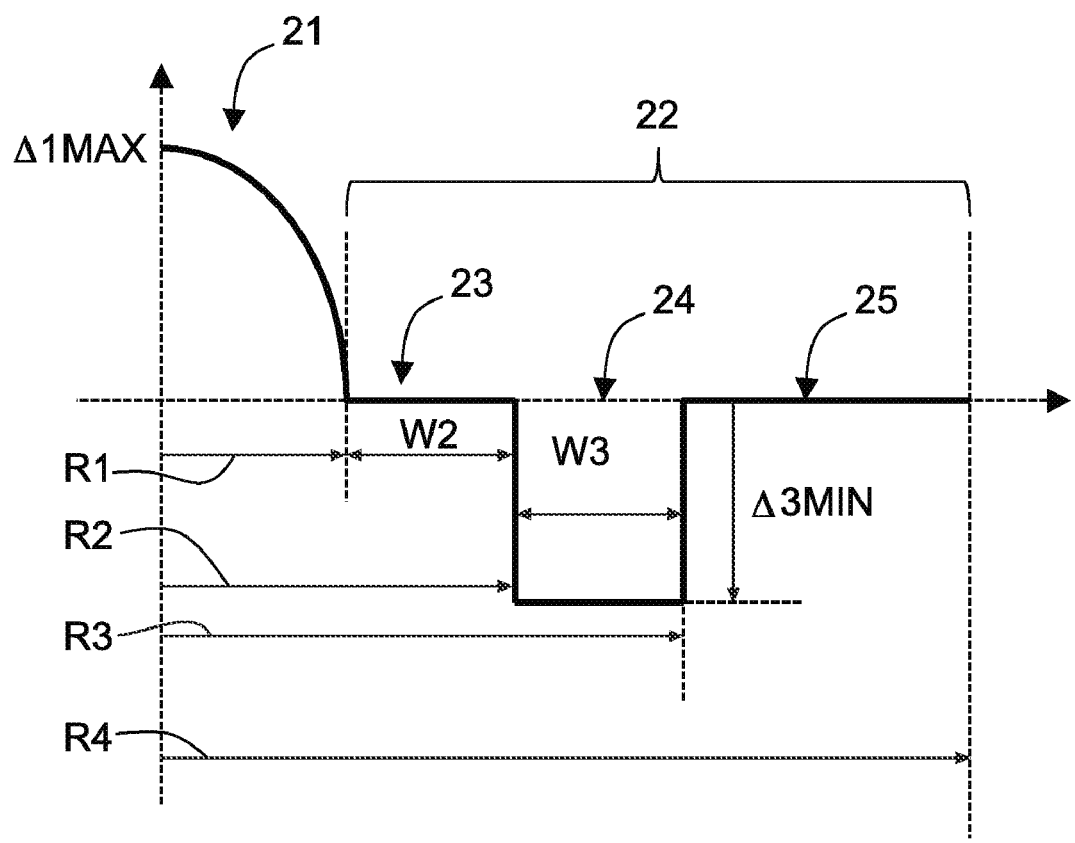
FIG. 7 shows an example schematic representation (not to scale) of the refractive index profile for the cross-section of FIG. 6, wherein the depressed-index annular portion is offset from the core by an inner annular portion and is surrounded by an outer annular portion.

As discussed above, fiber optical cable 10 includes a plurality of BR-MM fibers 20. FIG. 5 is a side view of an example BR-MM fiber 20, which has a central axis or "centerline" AC. FIG. 6 is an example cross-sectional view of BR-MM fiber 20 of FIG. 5. FIG. 7 shows a schematic representation of the refractive index profile of BR-MM fiber 20.

BR-MM fiber 20 has a glass core 21 and a glass cladding 22, the cladding comprising an inner annular portion 23, a depressed-index annular portion 24, and an outer annular portion 25. Core 21 has outer radius R1 and maximum refractive index delta Δ1MAX. The inner annular portion 23 has width W2 and outer radius R2. Depressed-index annular portion 24 has minimum refractive index delta percent Δ3MIN, width W3 and outer radius R3. The depressed-index annular portion 24 is shown offset, or spaced away, from the core 21 by the inner annular portion 23. Annular portion 24 surrounds and contacts the inner annular portion 23. The outer annular portion 25 surrounds and contacts the annular portion 24. The clad layer 22 is surrounded by at least one coating 26, which may in some embodiments comprise a low modulus primary coating and a high modulus secondary coating. An example BR-MM fiber 20 is the CLEARCURVE™ multimode fiber, available from Corning, Inc., Corning, N.Y.

An example inner annular portion 23 has a refractive index profile Δ2(r) with a maximum relative refractive index Δ2MAX, and a minimum relative refractive index Δ2MIN, where in some embodiments Δ2MAX=Δ2MIN. An example depressed-index annular portion 24 has a refractive index profile Δ3(r) with a minimum relative refractive index Δ3MIN. An example outer annular portion 25 has a refractive index profile Δ4(r) with a maximum relative refractive index Δ4MAX, and a minimum relative refractive index Δ4MIN, where in some embodiments Δ4MAX=Δ4MIN. Preferably, Δ1MAX>Δ2MAX>Δ3MIN. In some embodiments, the inner annular portion 23 has a substantially constant refractive index profile, as shown in FIG. 7 with a constant Δ2(r); in some of these embodiments, Δ2(r)=0%. In some embodiments, the outer annular portion 25 has a substantially constant refractive index profile, as shown in FIG. 7 with a constant Δ4(r); in some of these embodiments, Δ4(r)=0%. The core 21 has an entirely positive refractive index profile, where Δ1(r)>0%. Radius R1 is defined as the radius at which the refractive index delta of the core first reaches value of 0.05%, going radially outwardly from the centerline AC. In some embodiments, the inner annular portion 22 preferably has a relative refractive index profile Δ2(r) having a maximum absolute magnitude less than 0.05%, and Δ2MAX<0.05% and Δ2MIN>−0.05%, and the depressed-index annular portion 24 begins where the relative refractive index of the cladding first reaches a value of less than −0.05%, going radially outwardly from the centerline. In some embodiments, the outer annular portion 25 has a relative refractive index profile Δ4(r) having a maximum absolute magnitude less than 0.05%, and Δ4MAX<0.05% and Δ4MIN>−0.05%, and the depressed-index annular portion 24 ends where the relative refractive index of the cladding first reaches a value of greater than −0.05%, going radially outwardly from the radius where Δ3MIN is found.

BR-MM fiber 20 may comprise a graded-index core 21 and a cladding 22 surrounding and directly adjacent to the core region, with the cladding region comprising a depressed-index annular portion 24 comprising a depressed relative refractive index relative to another portion of the cladding. The depressed-index annular portion 24 of the cladding is preferably spaced apart from core 21. Preferably, the refractive index profile of the core 21 has a parabolic or substantially curved shape. The depressed-index annular portion 24 may, for example, comprise a) glass comprising a plurality of voids, or b) glass doped with one or more downdopants such as fluorine, boron, individually or mixtures thereof. The depressed-index annular portion 24 may have a refractive index delta less than about −0.2% and a width of at least about 1 micron, with the depressed-index annular portion being spaced from said core by at least about 0.5 microns.

In some embodiments, BR-MM fiber 20 comprises a cladding with voids, the voids in some preferred embodiments are non-periodically located within the depressed-index annular portion. "Non-periodically located" means that if one takes a cross section (such as a cross section perpendicular to the longitudinal axis) of the optical fiber, the non-periodically disposed voids are randomly or non-periodically distributed across a portion of the fiber (e.g. within the depressed-index annular region). Similar cross sections taken at different points along the length of the fiber will reveal different randomly distributed cross-sectional hole patterns, i.e., various cross sections will have different hole patterns, wherein the distributions of voids and sizes of voids do not exactly match for each such cross section. That is, the voids are non-periodic, i.e., they are not periodically disposed within the fiber structure. These voids are stretched (elongated) along the length (i.e. generally parallel to the longitudinal axis) of the optical fiber, but do not extend the entire length of the entire fiber for typical lengths of transmission fiber. It is believed that the voids extend along the length of the fiber a distance less than about 20 meters, more preferably less than about 10 meters, even more preferably less than about 5 meters, and in some embodiments less than 1 meter.

BR-MM fiber 20 exhibits very low bend-induced attenuation, in particular very low macrobending-induced attenuation. In some embodiments, high bandwidth is provided by low maximum relative refractive index in core 21, and low bend losses are also provided. Consequently, BR-MM fiber 20 fiber may comprise a graded index glass core 21; and an inner cladding 23 surrounding and in contact with core 21, and an outer cladding comprising a depressed-index annular portion 24 surrounding the inner cladding, said depressed-index annular portion having a refractive index delta less than about −0.2% and a width of at least 1 micron, wherein the width of said inner cladding is at least about 0.5 microns and the fiber further exhibits a 1 turn, 10 mm diameter mandrel wrap attenuation increase of less than or equal to about 0.4 dB/turn at 850 nm, a numerical aperture (NA) of greater than 0.14, more preferably greater than 0.17, even more preferably greater than 0.18, and most preferably greater than 0.185, and an overfilled bandwidth greater than 1.5 GHz-km at 850 nm. By way of example, the numerical aperture for BR-MM fiber 20 is between about 0.185 and about 0.215.

In an example embodiment, core 21 has a 50 micron diameter (nominal). Such BR-MM fibers 20 can be made to provide (a) an overfilled (OFL) bandwidth of greater than 1.5 GHz-km, more preferably greater than 2.0 GHz-km, even more preferably greater than 3.0 GHz-km, and most preferably greater than 4.0 GHz-km at an 850 nm wavelength. By way of example, these high bandwidths can be achieved while still maintaining a 1 turn, 10 mm diameter mandrel wrap attenuation increase at an 850 nm wavelength of less than 0.5 dB, more preferably less than 0.3 dB, even more preferably less than 0.2 dB, and most preferably less than 0.15 dB. These high bandwidths can also be achieved while also maintaining a 1 turn, 20 mm diameter mandrel wrap attenuation increase at an 850 nm wavelength of less than 0.2 dB, more preferably less than 0.1 dB, and most preferably less than 0.05 dB, and a 1 turn, 15 mm diameter mandrel wrap attenuation increase at an 850 nm wavelength, of less than 0.2 dB, preferably less than 0.1 dB, and more preferably less than 0.05 dB. Such fibers are further capable of providing a numerical aperture (NA) greater than 0.17, more preferably greater than 0.18, and most preferably greater than 0.185. Such fibers are further simultaneously capable of exhibiting an OFL bandwidth at 1300 nm which is greater than about 500 MHz-km, more preferably greater than about 600 MHz-km, even more preferably greater than about 700 MHz-km. Such fibers are further simultaneously capable of exhibiting minimum calculated effective modal bandwidth (Min EMBc) bandwidth of greater than about 1.5 MHz-km, more preferably greater than about 1.8 MHz-km and most preferably greater than about 2.0 MHz-km at 850 nm.

Preferably, BR-MM fiber 20 exhibits a spectral attenuation of less than 3 dB/km at 850 nm, preferably less than 2.5 dB/km at 850 nm, even more preferably less than 2.4 dB/km at 850 nm and still more preferably less than 2.3 dB/km at 850 nm. Preferably, BR-MM fiber 20 exhibits a spectral attenuation of less than 1.0 dB/km at 1300 nm, preferably less than 0.8 dB/km at 1300 nm, even more preferably less than 0.6 dB/km at 1300 nm.

In some embodiments, the core 21 extends radially outwardly from the centerline AC to a radius R1, wherein 10≦R1≦40 microns, more preferably 20≦R1≦40 microns. In some embodiments, 22≦R1≦34 microns. In some preferred embodiments, the outer radius of the core 21 is between about 22 to 28 microns. In some other preferred embodiments, the outer radius of the core is between about 28 to 34 microns.

In some embodiments, the core 21 has a maximum relative refractive index, less than or equal to 1.2% and greater than 0.5%, more preferably greater than 0.8%. In other embodiments, the core has a maximum relative refractive index, less than or equal to 1.1% and greater than 0.9%.

In some embodiments, BR-MM fiber 20 exhibits a 1 turn, 10 mm diameter mandrel attenuation increase of no more than 1.0 dB, preferably no more than 0.6 dB, more preferably no more than 0.4 dB, even more preferably no more than 0.2 dB, and still more preferably no more than 0.1 dB, at all wavelengths between 800 and 1400 nm. Example BR-MM fibers 20 are also disclosed in U.S. Pat. application Ser. Nos. 12/250,987 filed on Oct. 14, 2008, and 12/333,833 filed on Dec. 12, 2008, the disclosures of which are incorporated herein by reference.

Figure 8:
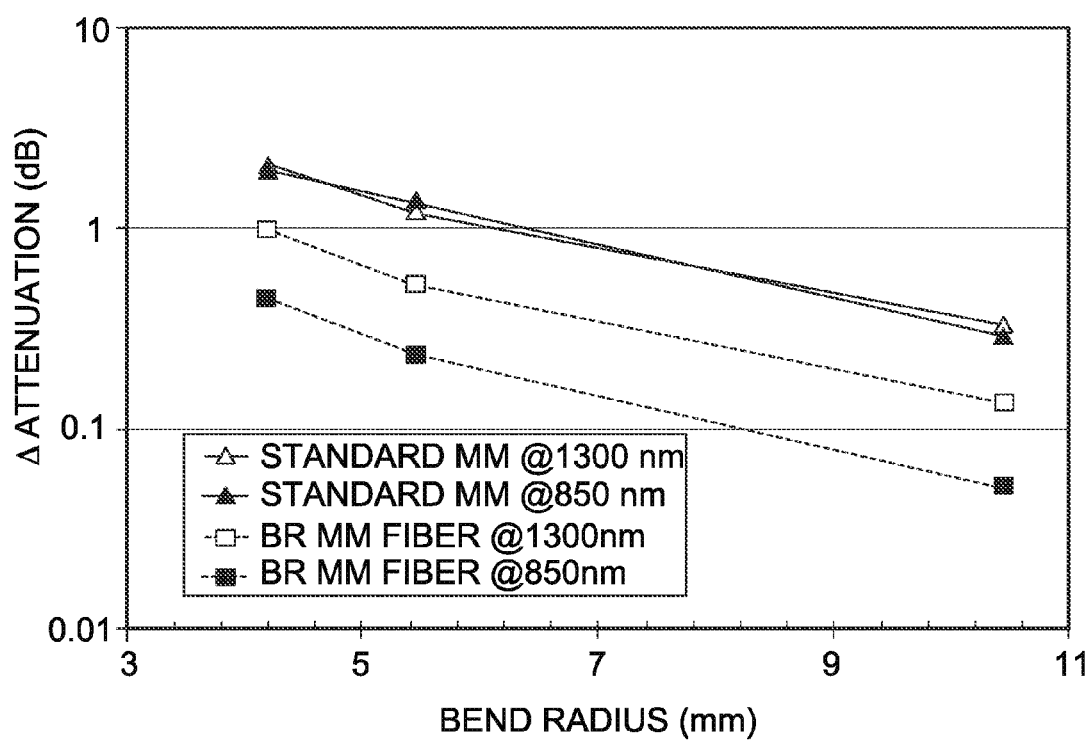
FIG. 8 is a plot of the change in attenuation ("Δ attenuation") in dB versus bend radius in mm for a standard 50 micron multimode fiber and a 50 micron bend-resistant multimode fiber at wavelengths of 850 nm and 1,300 nm.

FIG. 8 is a plot of the change in attenuation ("Δ attenuation") in dB versus bend radius in mm for standard 50 micron multimode fiber and 50 micron BR-MM fiber 20 at wavelengths of 850 nm and 1,300 nm. The bend radius was established using two wraps around mandrels having radii of 4.2 mm, 5.4 mm and 10.4 mm. A bend test around a 120 mm diameter mandrel as used to model projected attenuation for both the standard multimode fiber and BR-MM fiber 20. The modeling indicates that the BR-MM fiber 20 provides about a 4× attenuation benefit at 850 nm and about a 2× benefit at 1,300 nm.

The loss model information from FIG. 8 was applied to crush data taken on fiber optic cable 10 and the equivalent fiber optic cable having non-bend-resistant multimode optical fibers. The results indicate that the fiber optic cable 10 has a crush resistance (i.e., a resistance to crush-induced attenuation) that is about five to six times greater than the same cable with non-bend-resistant multimode optical fibers at a wavelength of 850 nm and a 5 mm bend radius. The results also indicate that the fiber optic cable 10 has a crush resistance that is between two and three times greater than the same cable with non-bend-resistant multimode optical fiber at a wavelength of 1300 nm and a 5 mm bend radius.

The resistance to crush for fiber optic cables can be tested by subjecting the cables to crush testing. Crush testing can be carried out according to the methodologies in TIA/EIA-455-41A-93. One methodology involves applying a specified load over a specified area. The load can be applied for a specified amount of time. In the present embodiments, a load of 100 N/cm is applied for 10 minutes using a 100 mm long plate. After 10 minutes the load is removed, and delta attenuation resulting from the crush force application is tested for one or more fibers in the cable.

Figure 4:
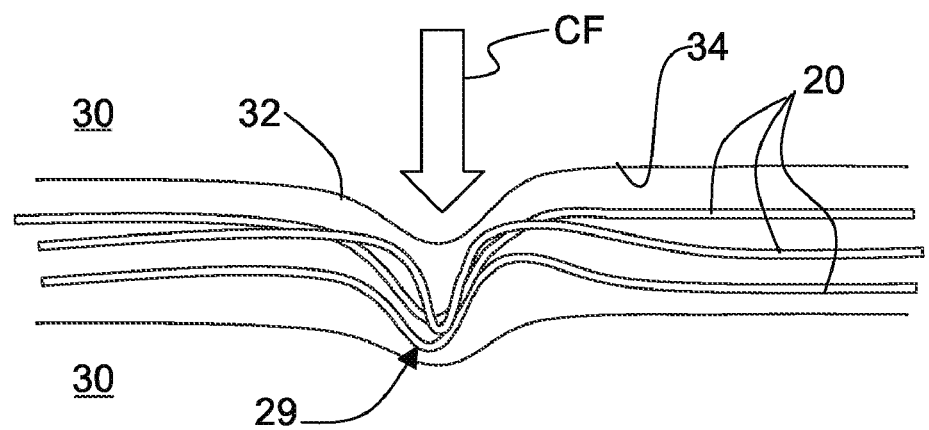
FIG. 4 is similar to FIG. 3, except it shows a crushing force that impart a severe bend to at least one of the bend-insensitive optical fibers.

Fiber optic cables according to the present embodiments may have exceptionally low delta attenuations when subjected to crush loads. For example, a fiber optic cable 10 as generally shown in FIGS. 1-2 subjected to a crush force CF as illustrated in FIG. 4 may exhibit very low delta attenuation. In a fiber optic cable having twelve fibers, simulated test data indicate the multimode fibers in the cable 10 will exhibit a delta attenuation of less than 0.4 decibels at a wavelength of 850 nanometers, and delta attenuation of less than 0.8 decibels at 1300 nanometers, when subjected to a 100 N/cm crush force CF for 10 minutes. One or more optical fibers in the cable 20 may experience a delta attenuation of less than 0.3 decibels at 850 nanometers, and less than 0.4 decibels at 1300 nanometers when subjected to the 100 N/cm crush force CF for 10 minutes.

Example

A fiber optic cable 10 as shown in FIGS. 1-2 has an outside diameter of 4.4 mm, a jacket 50 thickness of 1.05 mm, the jacket being made from PVC, and includes 12 CLEARCURVE® multimode fibers 40 or 12 50 micron single mode fibers for comparison purposes. When subjected to a crush load of 100 N/cm for ten minutes, simulated delta attenuation in the multimode fibers at a wavelength of 850 nanometers is in the range of 0.01-0.25 decibels, and in the range of 0.02-0.65 decibels at 1300 nanometers.

It will be apparent to those skilled in the art that various modifications and variations can be made to the present disclosure without departing from the spirit and scope of the disclosure. Thus, it is intended that the present disclosure cover the modifications and variations of this disclosure, provided they come within the scope of the appended claims and their equivalents.

I claim:

1. A crush-resistant fiber optic cable having a central axis, comprising:
    a plurality of bend-resistant multimode optical fibers generally arranged longitudinally about the central axis, with no strength member arranged along the central axis;
    a tensile-strength layer surrounding the plurality of bend-resistant optical fibers; and
    a protective cover surrounding the tensile-strength layer and having an outside diameter $D_O$ in the range 3 mm $\leq D_O \leq$ 5 mm, wherein the protective cover has a thickness $T_{50}$ in the range 0.75 mm $\leq T_{50} \leq$ 1.25 mm.

2. The crush-resistant fiber optic cable of claim 1, wherein the tensile-strength layer comprises aramid yarn.

3. The crush-resistant fiber optic cable of claim 1, wherein each bend-resistant multimode optical fiber has a nominal diameter of about 250 microns.

4. The crush-resistant fiber optic cable of claim 1, wherein the plurality of bend-resistant multimode optical fibers comprises at least twelve optical fibers.

5. A crush-resistant fiber optic cable having a central axis, comprising:
    a plurality of bend-resistant multimode optical fibers generally arranged longitudinally about the central axis, with no strength member arranged along the central axis;
    a tensile-strength layer surrounding the plurality of bend-resistant optical fibers; and
    a protective cover surrounding the tensile-strength layer and having an outside diameter $D_O$ in the range 3 mm $\leq D_O \leq$ 5 mm,
    wherein under a crush load of 100N/cm for 10 minutes, the optical fibers exhibit a delta attenuation of less than 0.4 decibels at a wavelength of 850 nanometers.

6. The crush-resistant fiber optic cable of claim 1, wherein under a crush load of 100N/cm for 10 minutes, the optical fibers exhibit a delta attenuation of less than 0.3 decibels at a wavelength of 850 nanometers.

7. The crush-resistant fiber optic cable of claim 1, wherein under a crush load of 100N/cm for 10 minutes, the optical fibers exhibit a delta attenuation of less than 0.8 decibels at a wavelength of 1300 nanometers.

8. The crush-resistant fiber optic cable of claim 1, wherein under a crush load of 100N/cm for 10 minutes, the optical fibers exhibit a delta attenuation of less than 0.4 decibels at a wavelength of 1300 nanometers.

9. The crush-resistant fiber optic cable of claim 4, wherein the tensile-strength layer comprises aramid yarn, each bend-resistant multimode optical fiber has a nominal diameter of about 250 microns.

10. The crush-resistant fiber optic cable of claim 1, wherein the plurality of bend-resistant multimode optical fibers each have a nominal diameter of about 250 microns;
   wherein the layer of aramid yarn is immediately surrounding the plurality of bend-resistant optical fibers; and
   wherein the protective cover is immediately surrounding the tensile-strength layer.

11. The crush-resistant fiber optic cable of claim 10, wherein the plurality of bend-resistant multimode optical fibers comprises at least twelve optical fibers.

12. The crush-resistant fiber optic cable of claim 10, wherein under a crush load of 100N/cm for 10 minutes, the optical fibers exhibit a delta attenuation of less than 0.4 decibels at a wavelength of 850 nanometers.

13. The crush-resistant fiber optic cable of claim 10, wherein under a crush load of 100N/cm for 10 minutes, the optical fibers exhibit a delta attenuation of less than 0.3 decibels at a wavelength of 850 nanometers.

14. The crush-resistant fiber optic cable of claim 10, wherein under a crush load of 100N/cm for 10 minutes, the optical fibers exhibit a delta attenuation of less than 0.8 decibels at a wavelength of 1300 nanometers.

15. The crush-resistant fiber optic cable of claim 10, wherein under a crush load of 100N/cm for 10 minutes, the optical fibers exhibit a delta attenuation of less than 0.4 decibels at a wavelength of 1300 nanometers.

16. The crush-resistant fiber optic cable of claim 10, wherein the protective cover comprises PVC, the plurality of bend-resistant multimode optical fibers comprises at least twelve optical fibers, and the outside diameter $D_O$ is less than 4.5 mm.

17. A method of forming a crush-resistant fiber optic cable having a central axis, comprising:
   disposing a plurality of bend-resistant multimode optical fibers generally longitudinally about the central axis, with no strength member arranged along the central axis;
   surrounding the plurality of bend-resistant optical fibers with a tensile-strength layer;
   extruding a protective cover around the tensile-strength layer, the protective cover having an outside diameter $D_O$ in the range 3 mm $\leq D_O \leq$ 5 mm; and
   forming the tensile-strength layer from wound aramid yarn, wherein the plurality of bend-resistant multimode optical fibers comprises at least twelve optical fibers
   wherein the protective cover comprises PVC and has a thickness $T_{50}$ in the range 0.75 mm $\leq T_{50} \leq$ 1.25 mm.

18. The crush-resistant fiber optic cable of claim 5, wherein the tensile-strength layer comprises aramid yarn.

19. The crush-resistant fiber optic cable of claim 5, wherein each bend-resistant multimode optical fiber has a nominal diameter of about 250 microns.

20. The crush-resistant fiber optic cable of claim 5, wherein the plurality of bend-resistant multimode optical fibers comprises at least twelve optical fibers.

* * * * *